Nov. 8, 1949 L. A. MAJNERI 2,487,716
PARKING VALVE FOR BRAKING SYSTEMS
Filed Dec. 4, 1944

INVENTOR.
LUDWIG A. MAJNERI
BY
Whittemore Hulbert & Belknap
ATTORNEYS

Patented Nov. 8, 1949

2,487,716

UNITED STATES PATENT OFFICE 2,487,716

PARKING VALVE FOR BRAKING SYSTEMS

Ludwig A. Majneri, Grosse Pointe, Mich., assignor to The Warner Aircraft Corporation, Detroit, Mich., a corporation of Michigan Application December 4, 1944, Serial No. 566,532

4 Claims. (Cl. 60—54.5)

This invention relates generally to valve assemblies and refers more particularly to power parking valves for use in connection with hydraulic braking systems having a source of fluid pressure supply such, for example, as an accumulator.

One of the principal objects of this invention is to provide an improved power parking valve for supplying fluid under pressure to the brake or brakes of the system to apply the latter and for maintaining the same applied for parking purposes regardless of pressure drops in the supply lines resulting from substantial temperature changes.

Another feature of this invention is to provide a power parking valve which, in addition to performing the above function, also acts as a reducing valve to limit the amount of pressure admitted to the brake or brakes from the accumulator. This feature is especially advantageous in instances where the assembly is installed on aircraft or vehicles equipped with relatively high pressure accumulators since it enables employing the latter as a source of fluid pressure supply for parking the brake or brakes without the danger of stressing any part of the braking system beyond its specified factor of safety by supplying excessive pressures to the brakes.

A further object of this invention is to provide a valve assembly having a control valve for controlling the flow of fluid under pressure from the normal brake actuating means to the brake or brakes and having a parking valve responsive to close the control valve and supply fluid under pressure to the brake or brakes from a second source of supply with a pressure which is proportional to the pressure at the second source.

In addition to the above this invention contemplates a power parking valve of the general type previously set forth capable of being used with at least two independent hydraulic braking systems for operating the brakes in each of the systems.

The foregoing as well as other objects will be made more apparent as this description proceeds, especially when considered in connection with the accompanying drawing, wherein.

Figures 1, 2, 3:
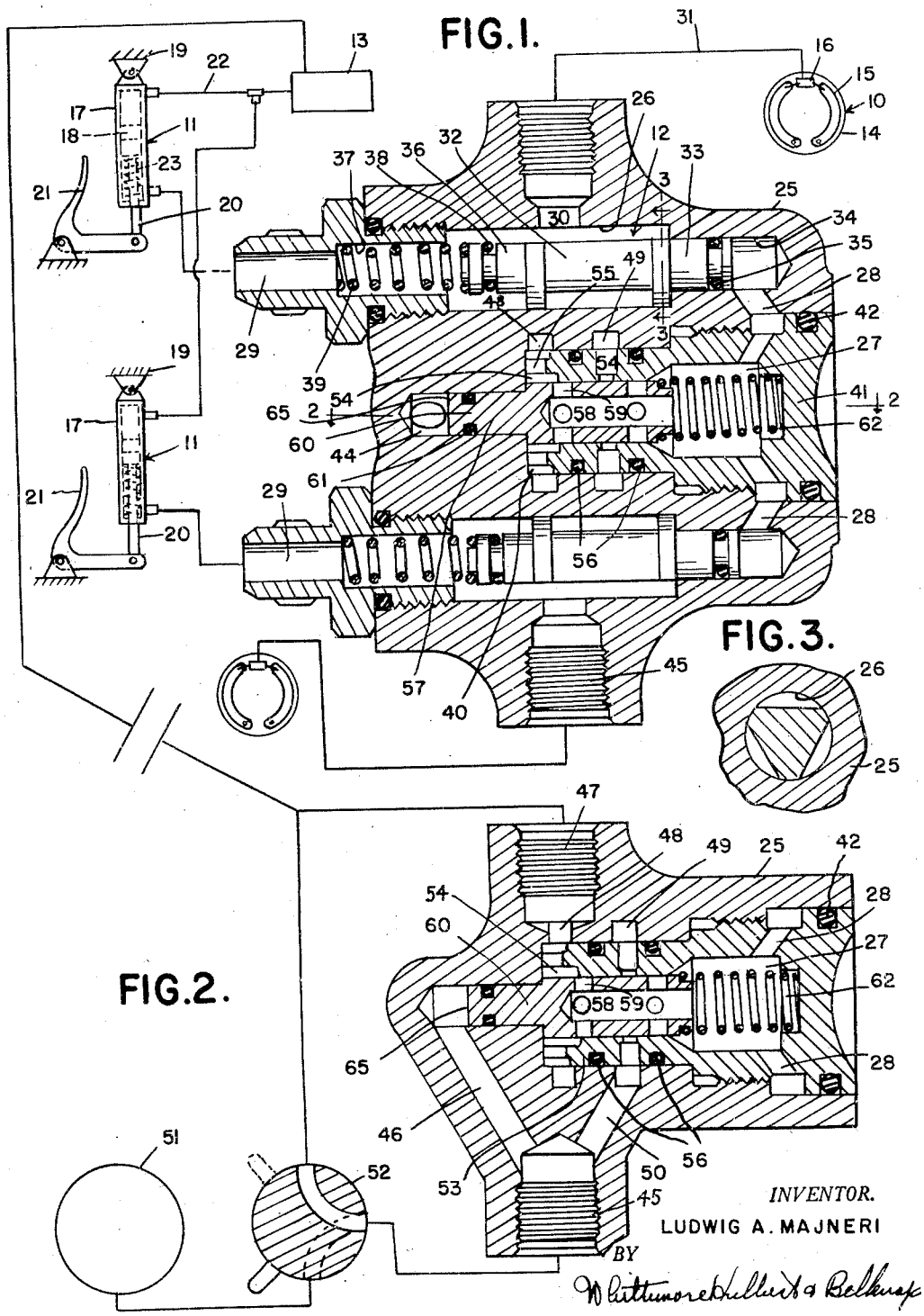
Figure 1 is a sectional view through a valve assembly constructed in accordance with this invention and diagrammatically showing the valve in association with two separate braking systems.
Figure 2 is a sectional view taken substantially on the plane indicated by the line 2—2 of Figure 1.
Figure 3 is a cross-sectional view taken on the plane indicated by the line 3—3 of Figure 1.

Although the valve assembly forming the subject matter of this invention may be used in connection with practically any type of hydraulic braking system where it is desired to park the brakes or, in other words, to maintain the latter applied while the vehicle or other conveyance is standing, nevertheless, the valve assembly is especially adapted for use in connection with two or more separate hydraulic braking systems. Still more particularly the valve assembly finds special use when employed in connection with aircraft having two separate braking systems and having an accumulator for storing fluid at relatively high pressure.

With the above in view reference is made to Figure 1 of the drawing, wherein it will be noted that each braking system comprises a hydraulic brake 10, a pressure producing device or master cylinder 11, and a control valve 12 located between the brake and master cylinder. A common reservoir 13 is provided for both hydraulic braking systems. The hydraulic brake 10 may be any one of a number of accepted constructions having a brake drum 14 and having brake friction means 15. The brake friction means 15 is supported in the drum 14 for movement into engagement with the drum by a suitable hydraulic actuator 16.

The master cylinder 11 in each hydraulic braking system may also be of any accepted design and is shown diagrammatically as having a cylinder 17 and a piston 18 reciprocably mounted in the cylinder. The upper end of the master cylinder 17 is suitably pivotally connected to a support 19 and the lower end of the master cylinder is apertured to receive a rod 20. The upper end of the rod is connected to the piston 18 and the lower end thereof is connected to a manually operable control 21. It will also be noted that the upper ends of the cylinders 17 are connected to the reservoir 13 by a conduit 22 and the lower ends of the cylinders 17 are respectively connected to the brakes 10 through the shuttle valves 12. Briefly the construction is such that when either control 21 is manually operated, the piston 18 of the associated master cylinder is moved downwardly against the action of the spring 23 to supply fluid under pressure to the selected brake. On the other hand release of the control 21 enables the piston 18 to move upwardly and thereby reduce the pressure in the associated system sufficiently to release the brake.

In braking systems of the above general type it is frequently desirable to make some provision for parking or maintaining the brakes 10 applied while the vehicle or aircraft is standing. Considerable difficulty has been experienced in certain installations of the parking features in maintaining the brakes applied during substantial variations in the temperature of the surrounding atmosphere. For example a substantial drop in the temperature of the surrounding atmosphere may cause the fluid under pressure in the lines leading to the brakes to contract to such an extent that the brakes are partially or fully released.

It has been proposed to compensate for either expansion or contraction of the braking fluid in the lines leading to the brakes by providing spring loaded pistons in these lines. This attempt to solve the problem was not satisfactory, especially in installations where the fluid pressure lines are, of necessity, of great length and require a fluid pressure reserve of substantial capacity. In other words the spring loaded piston devices would necessarily have to be of a size far greater than is practical and would require successive pumping operations of the control 21 or master cylinder to supply sufficient fluid to compensate for any appreciable amount of contraction of the fluid in the system.

The foregoing objections are overcome by the valve assembly shown in the drawing and embodying the present invention. In detail this valve assembly comprises a housing 25 having two cylindrical valve chambers 26 and having a pressure chamber 27 communicating with corresponding ends of the valve chambers 26 through intake ports 28. The opposite ends of the chambers 26 respectively communicate with the lower ends of the cylinders 17 through the medium of intake ports 29. The chambers 26 are also provided with outlet ports 30 intermediate the inlet ports and these outlet ports respectively communicate with the brakes in the two systems through the medium of conduits 31.

A valve member 32 is supported in each chamber 26 for movement in opposite directions and the rear end portions 33 of the valve members respectively project into reduced portions 34 at the corresponding ends of the chambers 26 to close the inlet ports 28. A suitable O-ring seal 35 is provided on the portion 33 of each valve to seal the intake ports 28 from the chambers 26. The opposite end portions 36 of the valves 32 are respectively adapted to project into reduced portions 37 at the corresponding ends of the chambers 26 to respectively close the inlet ports 29. A similar O-ring seal 38 is provided on the portion 36 of each valve to prevent the escape of fluid under pressure between the chambers 26 and inlet ports 29 when the portions 36 occupy positions in the reduced portions 37.

The valves 32 are normally urged to the positions shown in Figure 1 wherein the inlet ports 28 are respectively closed by the portions 33 on the valves by coil springs 39 acting upon the front end portions 36 of the valves. When the valves 32 are in the positions shown in Figure 1, it will also be noted that communication is established between the inlet ports 29 and their respective outlet ports 30. Thus either or both hydraulic brakes 10 may be applied by selective or simultaneous manipulation of the operators 21.

A third valve chamber 40 is formed in the housing 25 between the chambers 26. The rear end of the chamber 40 is closed by a cap 41 having a recess registering with the rear end of the chamber 40 and forming the pressure chamber 27. The periphery of the cap adjacent the rear end of the latter is formed with an annular groove for receiving an O-ring 42 which engages the adjacent surface of the housing to prevent the escape of fluid under pressure through the joint between the cap and housing. The front portion of the housing is reduced to form a chamber 44 and the latter communicates with a port 45 through the medium of a passage 46. A second port 47 registers with an annular groove 48 surrounding the chamber 40 and connected to the reservoir 13 through the port 47. A similar annular groove 49 is spaced axially from the groove 48 and communicates with the port 45 through the medium of a passage 50. The port 45 selectively communicates with a high pressure accumulator 51 and the reservoir 13 through a three-way valve 52.

A sleeve 53 formed of a material of high wearing qualities is secured in the chamber 40 and is formed on the inner surface thereof with axially spaced grooves 54 which respectively communicate with the grooves 48 and 49 through radial ports 55. Suitable O-ring seals 56 are provided on the sleeve 53 for engaging the adjacent surface of the chamber 40 to prevent the escape of fluid under pressure through the joint between the sleeve 53 and adjacent wall of the chamber 40.

A valve 57 is supported in the sleeve 53 for movement in opposite directions. The body of the valve is lapped in the sleeve 53 and is formed with an axial passage 58 which communicates at the rear end with the chamber 27. The body of the valve is also formed with radial ports 59 which alternately communicate with the ports 45 and 47 upon movement of the valve 57 in opposite directions in the chamber 40.

The valve 57 is shown in Figure 1 as having a reduced portion 60 at the front end which projects into the reduced portion 44 of the chamber 40 and is provided with an O-ring seal 61 to prevent the escape of fluid under pressure from the chamber 44 past the valve. The rear end of the valve projects into the chamber 27 and has an area substantially greater than the area of the front end of the valve. Also the rear end of the valve is engaged by a spring 62 supported in the chamber 27 with opposite ends respectively abutting the cap 41 and the rear end of the valve 57. Thus it will be noted that the coil spring 62 normally urges the valve 57 to the position thereof shown in Figure 1 wherein the chamber 27 communicates with the outlet port 47.

Assuming that the several parts of the valve assembly are in the relative positions thereof shown in Figure 1 and that the valve 52 is adjusted to connect the port 45 to the reservoir 13, it will be noted that fluid under pressure in the chambers 27 and 44 is returned to the reservoir through the ports 47 and 45 respectively. On the other hand when the valve 52 is adjusted to the dotted line position shown in Figure 2, it will be noted that fluid under pressure from the accumulator is admitted to the chamber 44 through the port 45. The force resulting from the pressure in the chamber 44 acts on the small area 65 of the valve 57 and moves the latter rearwardly against the action of the spring 62. As the valve 57 moves rearwardly, the port 59 in the valve moves out of registration with the groove 54 or port 47 and registers with the port 45. As a result fluid under pressure enters the chamber 27 and flows through the ports 28 to the rear ends of the chambers 26. The force resulting from the fluid under pressure in the rear ends of the chambers 26 moves the valves to positions wherein the latter close the intake ports 29 and establish communication between the ports 30 and the ports 28. Thus the fluid under pressure from the accumulator is admitted to the hydraulic actuators 16 and the brakes 10 are applied thereby.

The fluid under pressure in the chamber 27 also acts on the rear end of the valve which has an area substantially greater than the area of the front end 65 of the valve. When the force resulting from the pressure in the chamber 27 plus the force exerted by the spring 62 overcomes the force acting on the front end 65 of the valve, the latter is moved forwardly to close communication between the chamber 27 and the port 45. Thus it will be noted that the valve 57 shifts back and forth between the ports 45 and 47 to maintain the proper parking pressure at the brakes. In other words if the pressure in the chamber 27 should drop due to contraction of the fluid pressure in the lines leading to the brakes, the valve 57 merely shifts rearwardly to admit additional fluid under pressure from the port 45 or accumulator to establish the desired balance. On the other hand if the pressure in the chamber 27 should rise due to expansion of the fluid pressure in the lines leading to the brakes, the valve 57 merely shifts forwardly to bleed a sufficient amount of the fluid under pressure back into the reservoir to establish the desired balance.

What I claim as my invention is:

1. In a fluid pressure operated mechanism, a valve assembly comprising a housing provided with a valve chamber having longitudinally spaced inlet and outlet ports, a pressure chamber in the housing, a second inlet port in the valve chamber communicating with the pressure chamber, a control valve movable in one direction in the chamber by fluid pressure admitted through the first inlet port to open the latter to the outlet port and to close the second inlet port, said control valve being movable in the opposite direction by the fluid pressure in the pressure chamber to close the first inlet port and to open the second inlet port to the outlet port, a second valve chamber in the housing communicating at one end with the pressure chamber and having inlet and outlet ports, and a valve member having fluid pressure responsive differential areas slidably supported in the second chamber with the portion of the smaller area exposed to the inlet port in the second chamber and with the portion of the greater area exposed to the pressure chamber, said valve chambers having a port in constant communication with the pressure chamber and positioned to alternately register with the inlet and outlet ports of the second valve chamber upon reciprocation of said valve member.

2. In fluid pressure operated mechanism, a valve assembly including a cylindrical chamber reduced at one end, a valve member movable in opposite directions in the chamber and having a reduced end forming a pressure responsive element engageable in the reduced portion of the chamber, a pressure space in the chamber at the relatively large diameter end of the valve and having an outlet therefrom, the larger end of said valve member forming a fluid pressure responsive element engageable in said space, an outlet port in the chamber spaced from the pressure space, a second port in the chamber between the outlet port and pressure chamber, a third port in the reduced end of the chamber beyond the reduced end of the valve, a passage in the valve member arranged in constant communication with the pressure space and having a port positioned to alternately register with the outlet and second ports in the chamber upon movement of the valve member in opposite directions in the chamber.

3. Fluid pressure operated mechanism comprising a pair of pressure producing devices, a source of fluid under pressure, a reservoir, a pair of fluid pressure operated actuators, a valve assembly including a housing provided with two laterally spaced chambers respectively having inlet ports connected to the pressure producing devices, outlet ports in the chambers respectively connected to the hydraulic actuators, a second inlet port in each chamber, a pressure chamber in the housing communicating with both valve chambers through the second inlet ports and connected to the source of fluid under pressure, a valve member movable in one direction in each valve chamber by fluid pressure supplied from the pressure producing devices to open the first inlet ports to said outlet ports and to close the second inlet ports, said valve member being movable in the opposite direction by fluid under pressure supplied to the pressure chamber to close the first inlet ports and to open the second inlet ports to said outlet ports, a third valve chamber in the housing communicating at one end with the pressure chamber and having a space at the opposite end, a first port in the housing connected to said space and to the third chamber intermediate the ends thereof, a second port in the housing connecting the third chamber to the reservoir at a point spaced from the connection between the first port and third chamber, means for selectively connecting the first port of the third chamber to the reservoir and to the source of fluid under pressure, a valve member slidably supported in the third chamber and having portions of different areas respectively exposed to the fluid pressure in the pressure chamber and said space, and a passage in the valve member arranged in constant communication with the pressure chamber and having a port alternately registerable with the first and second ports of the third chamber upon movement of the valve member in opposite directions.

4. A fluid pressure operated mechanism, a valve assembly including a chamber having first and second ports spaced from each other axially of the chamber, a valve member slidably supported in the chamber and having axially spaced portions presenting different fluid pressure responsive areas to the action of fluid under pressure, a pressure space in the chamber opposite the portion of the valve member of greatest area and having an outlet port, a second space in the chamber opposite the portion of the valve member of lesser area and communicating with said first port, a passage in the valve member arranged in constant communication with the pressure space and having a port alternately registerable with the first and second ports in the chamber upon movement of the valve member in opposite directions.

LUDWIG A. MAJNERI.

REFERENCES CITED

The following references are of record in the file of this patent:

UNITED STATES PATENTS

| Number | Name | Date |
| --- | --- | --- |
| 180,460 | Chadwick | Aug. 1, 1876 |
| 2,167,328 | Beggs | July 25, 1939 |
| 2,170,086 | McCune | Aug. 22, 1939 |
| 2,200,824 | Herman | May 14, 1940 |
| 2,225,515 | Wood | Dec. 17, 1940 |
| 2,273,171 | Bennett | Feb. 17, 1942 |
| 2,275,255 | Freeman | Mar. 3, 1942 |
| 2,306,346 | Rockwell | Dec. 22, 1942 |
| 2,313,991 | Fitch | Mar. 16, 1943 |
| 2,367,194 | Boldt | Jan. 16, 1945 |